March 1, 1960 G. C. DEVOL 2,926,844

SENSING DEVICE FOR MAGNETIC RECORD

Filed March 14, 1952

INVENTOR
GEORGE C. DEVOL
BY Paul S. Martin
ATTORNEY

United States Patent Office 2,926,844
Patented Mar. 1, 1960

2,926,844

SENSING DEVICE FOR MAGNETIC RECORD

George C. Devol, Greenwich, Conn.

Application March 14, 1952, Serial No. 276,627

7 Claims. (Cl. 235—61.11)

This invention relates to a device for sensing magnetic records such as cards, tapes and the like suitable for controlling business machines. This application is a continuation in part of my copending Patent No. 2,590,091 issued March 25, 1952 on an application filed April 2, 1946.

A feature of the invention is the provision of a novel apparatus for sensing magnetic index points on record cards and the like which is not dependent upon relative movement between the record card and the sensing apparatus. By means of the present invention gang sensing of an entire card or a predetermined area thereof is possible. Furthermore any of the well known step by step feeding arrangements may be used to produce relative movement of the magnetic card and the sensing apparatus when it is desired to sense one column of a card at a time. Sensing devices of the present invention are also responsive to the data on a card, tape, or the like when the record medium is fed continuously past the sensing apparatus.

A sensing device according to the present invention comprises one or more cores of magnetic material each having a gap therein. Known card feeding means may be used to feed cards past the gap in the cores so that the presence or absence of magnetized index points in any given portion of the cards when positioned at the gap will produce a corresponding change in magnetization of the core associated therewith. Any of a number of means distinct from the record card may be used to produce rapid, advantageously, repetitive variations of the flux path across the gap in the opposed core. A pickoff winding provided for each core controls external circuits through suitable detector circuits, the detector circuits being differently responsive to signals in the associated pickoff winding as dissimilar portions of the record cards are brought into register with the gap of the core. With this arrangement the control effect upon the detector circuits does not depend upon the relative movement of the magnetically recorded indicia of the cards with respect to the associated gap in the core but upon the static magnetic conditions introduced by each index point when positioned in register with the associated gap.

Figure 1:
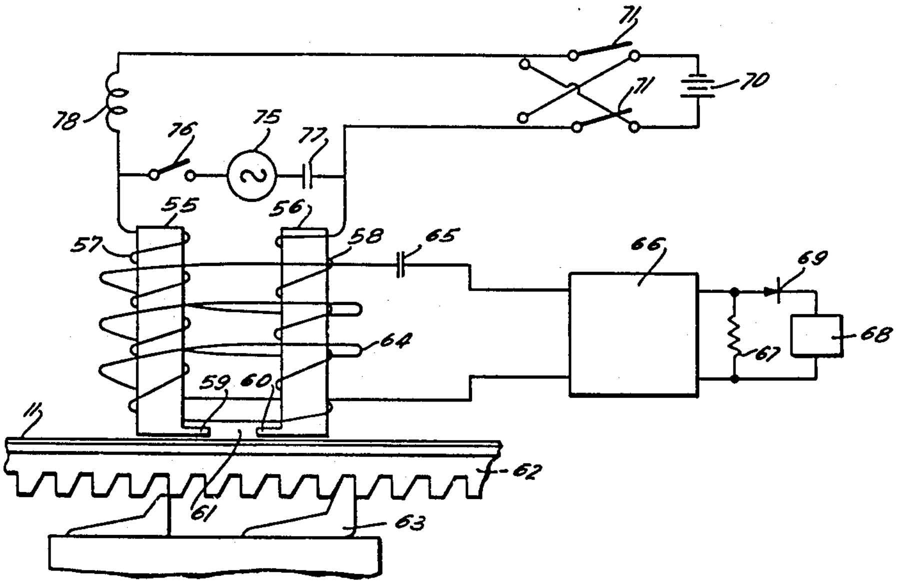
Figure 2:
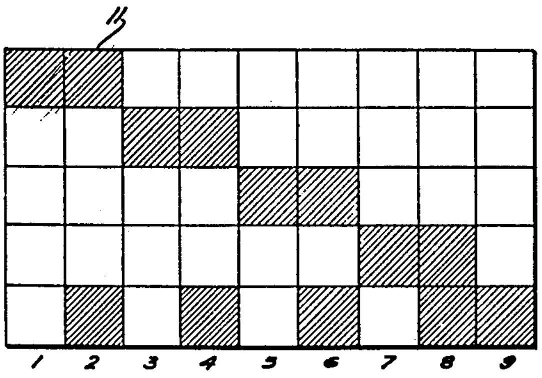

The invention will now be described with the aid of the accompanying drawings, of which Fig. 1 shows schematically an illustrative form of the invention in which the gap in the magnetic circuit of a sensing device is disposed adjacent one surface of a magnetic business machine card; and Fig. 2 is a chart showing a code suitable for certain forms of magnetic business machine cards.

Any form of cards having magnetizable index points may be used with the illustrative embodiment of the invention described herein. Such cards may be of paper impregnated or coated in desired areas with a suitable magnetizable metallic powder, or a magnetic film on a nonmagnetic material coated with deposits of magnetic material in discrete areas such as shown in the codal pattern of card 11 in Fig. 2, or strip steel may be used.

All of the types of magnetizable cards just referred to may have any recorded data thereon erased by passing the card through an alternating current field.

An illustrative card sensing arrangement is shown in Fig. 1 where a pair of pole pieces 55 and 56 provided with balanced windings 57 and 58 are formed with projections 59 and 60 extending toward each other leaving a small gap 61 therebetween which is adapted to be positioned over the index points on a card 11. The card is fed by any suitable intermittent feeding mechanism such as the step-by-step arrangement represented by the rack 62 and pawl 63 so that the respective index points of a row of index points are positioned momentarily opposite the gap 61 to modify the flux path between the pole pieces 55 and 56 according to the data recorded on the card. A suitable card feeding mechanism is shown in the U. S. Patent 2,421,069 to W. F. Kelley et al.

A winding 64 common to both pole pieces 55 and 56 has its output connected through a capacitor 65 to the input of an amplifier 66. A resistor 67 is connected across the output terminals of the amplifier which control a utilization device 68 through a rectifier 69.

A source of direct current 70 has opposite poles connected through a double pole double throw reversing switch 71 through choke coil 78 to corresponding terminals of windings 57 and 58. The opposite terminals of windings 57 and 58 are connected together and the direction of the windings is such that opposite poles are produced on opposite sides of the gap 61. A source of alternating current 75 is connected by a switch 76 and capacitor 77 across the terminals of windings 57 and 58. With capacitor 77, choke 78 isolates direct current source 70 from alternating current source 75. With this arrangement a flux due to the current from source 70 is set up across gap 61 and current from the alternating source 75 produces rapid cyclically varying magnetomotive force in the magnetic circuit. When a magnetized index point is positioned opposite gap 61 the magnetization of the magnetic circuit is changed so as to induce a voltage in the common winding 64 which when amplified controls the utilization device 68.

Advantageously, the core material used in the embodiments discussed above are of especially high permeability, such as Mumetal and the like, developing high flux density and reaching saturation at low levels of magnetomotive force.

In order to sense a card of the type shown in Fig. 2, a sensing device of the kind shown in Fig. 1 is provided for each of the five rows of horizontal index points, the five sensing devices being arranged side by side in any suitable arrangement. Each of the sensing devices is provided with an output amplifier that controls a suitable utilization device 68 which may be a solenoid for actuating the keys of a bookkeeping machine for printing a new balance. A bookkeeping machine having solenoid actuated keys is disclosed in Patent No. 2,412,537.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. Apparatus for sensing magnetic records having discrete control areas, including a saturable magnetic core structure having a gap therein, means for supporting a magnetic record with a selected discrete control area thereof in sensing position at said gap, said supporting means including mechanism of the type to advance the record rapidly and arrest the record in sensing position, alternating current exciting means and alternating current output means assembled to said core structure, one of said alternating current means having balanced halves, said alternating current means being effective to produce an output in response to a magnetized control area of a record arrested in sensing position, and unidirectional magnetic bias means for said core structure.

2. Apparatus for sensing magnetic records having discrete control areas, including a saturable magnetic core having a gap therein, a card feeder for magnetic record cards including means for advancing the magnetic cards individually and effective to arrest and locate discrete control areas of the cards in sensing relation to said gap, alternating current exciting and pickup means for said core structure balanced in the absence of a magnetized control area at said gap but effective to produce a sustained signal when a magnetized control area of a record card is arrested in sensing position by said card feeder, and means assembled to said core structure for establishing therein a bias magnetomotive force, said means including a two-part balanced coil, separate direct current and alternating current supplies connected to said balanced coil, and means in the connection between said supplies effectively preventing each supply from loading the other.

3. Apparatus for sensing magnetic records having discrete control areas, including a magnetic core structure having two separately magnetizable portions separated by an air gap and formed of magnetic material saturable at low levels of magnetomotive force, means for supporting a magnetic record with a discrete control area thereof at said air gap, alternating current exciting means for said magnetic core structure, output signal means including a coil assembled to said core structure and responsive differently to different magnetic conditions of the control areas disposed at different times in sensing position, and unidirectional magnetic biasing means associated with said core portions and arranged to produce opposite magnetic poles on opposite sides of the air gap.

4. Apparatus in accordance with claim 3, wherein said unidirectional biasing means includes respective coils about said core portions and direct-current energizing means for said coils.

5. Apparatus in accordance with claim 3, wherein said magnetic biasing means and said alternating current exciting means includes a common pair of balanced coils about said core portions respectively.

6. Apparatus in accordance with claim 5, including external direct-current and alternating-current exciting means, said exciting means being connected to said coils and said coils being connected in series.

7. Apparatus for sensing data recorded on a record-bearing medium in the form of patterns of discrete magnetized areas, comprising in combination, a pair of magnetic core members disposed to present a sensing gap between portions thereof, energizing means for impressing cyclically varying magnetomotive forces upon said core members, said energizing means comprising a first winding associated with one of said pair of core members, a second winding associated with the other of said pair of core members and a source of alternating current connected with said windings, said windings being balanced to produce substantially equal and opposite fluxes in said core members by said energizing means, means associated with said core members for impressing thereon a bias magnetomotive force about which the cyclically varying magnetomotive force alternates, signal pickup means inductively coupled with said core members, and step-by-step record transporting means for locating said magnetic record bearing medium in a sequence of discrete relationships with said sensing gap.

References Cited in the file of this patent

UNITED STATES PATENTS

| | | |
|---|---|---|
| 2,254,931 | Bryce | Sept. 2, 1941 |
| 2,294,681 | Moon | Sept. 1, 1942 |
| 2,423,339 | Newman | July 1, 1947 |
| 2,424,295 | Williams | July 22, 1947 |
| 2,496,579 | Cheney et al. | Feb. 7, 1950 |
| 2,547,838 | Russell | Apr. 3, 1951 |
| 2,581,209 | Shephard et al. | Jan. 1, 1952 |
| 2,608,621 | Peterson | Aug. 26, 1952 |